(12) United States Patent
Ge et al.

(10) Patent No.: US 9,422,883 B2
(45) Date of Patent: Aug. 23, 2016

(54) INCREASED EXHAUST TEMPERATURE WARM-UP FOR A RAPID LIGHT-OFF OF A CLOSE-COUPLED DIESEL OXIDATION CATALYST

(71) Applicant: GM GLOBAL TECHNOLOGY OPERATIONS LLC, Detroit, MI (US)

(72) Inventors: Ping Ge, Northville Township, MI (US); Ryu Hariyoshi, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 14/277,886

(22) Filed: May 15, 2014

(65) Prior Publication Data
US 2015/0330278 A1 Nov. 19, 2015

(51) Int. Cl.
*F01N 3/00* (2006.01)
*F01N 3/02* (2006.01)
*F01N 3/10* (2006.01)
*F01N 3/20* (2006.01)
*F02D 41/06* (2006.01)
*F01N 9/00* (2006.01)
*F02D 41/02* (2006.01)
*F02D 41/00* (2006.01)

(52) U.S. Cl.
CPC ........... *F02D 41/064* (2013.01); *F01N 3/2033* (2013.01); *F01N 9/00* (2013.01); *F02D 41/0002* (2013.01); *F02D 41/0055* (2013.01); *F02D 41/0255* (2013.01); *F02D 41/062* (2013.01); *F02D 41/0007* (2013.01); *F02D 2041/0017* (2013.01); *Y02T 10/26* (2013.01); *Y02T 10/42* (2013.01); *Y02T 10/47* (2013.01)

(58) Field of Classification Search
CPC ................... Y02T 10/26; Y02T 10/44; F02D 2200/0802; F02D 41/029; F02D 41/405
USPC ..................... 60/286, 287, 295, 300
See application file for complete search history.

(56) References Cited

U.S. PATENT DOCUMENTS

| 2004/0000136 | A1* | 1/2004 | Miura | F01N 3/2006 60/284 |
| 2008/0314028 | A1* | 12/2008 | Christner | B01D 53/9495 60/286 |
| 2010/0126142 | A1* | 5/2010 | Murata | B60K 6/48 60/278 |
| 2013/0118163 | A1* | 5/2013 | Nishimura | F02D 41/0255 60/605.1 |

* cited by examiner

Primary Examiner — Audrey K Bradley
Assistant Examiner — Dapinder Singh
(74) Attorney, Agent, or Firm — Quinn Law Group, PLLC

(57) ABSTRACT

A method is provided for generating rapid light-off for a diesel oxidation catalyst (DOC) close-coupled to a compression-ignition engine. The engine includes an intake passage in fluid communication with a combustion chamber, a throttle for controlling a flow of intake air through the intake passage, and an exhaust passage configured to channel an exhaust gas from the combustion chamber to the DOC. The method includes starting the engine to commence a warm-up thereof and regulating the throttle to restrict supply of the intake airflow to the combustion chamber. The method additionally includes injecting a predetermined amount of fuel into the combustion chamber during the engine's exhaust cycle such that the injected fuel is carried by the exhaust gas and burned in the exhaust passage. Regulating the throttle and injecting fuel during the warm-up of the engine together increase temperature of the exhaust gas for rapid light-off of the close-coupled DOC.

18 Claims, 3 Drawing Sheets

US 9,422,883 B2

INCREASED EXHAUST TEMPERATURE WARM-UP FOR A RAPID LIGHT-OFF OF A CLOSE-COUPLED DIESEL OXIDATION CATALYST

TECHNICAL FIELD

The present disclosure is drawn to a system and a method for increased exhaust temperature warm-up for a rapid light-off of a diesel oxidation catalyst close-coupled to a compression-ignition engine.

BACKGROUND

Internal combustion engines, whether spark- or compression-ignition types, are often employed for powering vehicles, either as a primary power source, or as part of a hybrid powertrain. Various systems have been specifically developed to treat exhaust gases of such engines.

In the case of compression-ignition, i.e., diesel, engines, an AT system frequently incorporates a diesel oxidation catalyst (DOC) and a selective catalytic reduction (SCR) catalyst. The primary use of the DOC is to reduce amount of hydrocarbons (HC) by oxidation and storing HC in the catalyst. In the presence of ammonia ($NH_3$), the SCR catalyst is used to convert oxides of nitrogen ($NO_X$) into diatomic nitrogen ($N_2$) and water ($H_2O$).

Generally, when the temperature of the exhaust gas reaches a predetermined value, the DOC lights-off, i.e., becomes activated and reaches operating efficiency, at elevated temperatures. Therefore, the DOC is sometimes mounted in close proximity, i.e., close-coupled, to the engine in order to reduce loss of thermal energy from the exhaust gas flow prior to the exhaust gas reaching the DOC.

SUMMARY

A method is provided for generating, via an electronic controller, a rapid light-off for a diesel oxidation catalyst (DOC) close-coupled to a compression-ignition engine. The engine includes an intake passage, a throttle configured to control supply of a flow of intake air through the intake passage, a combustion chamber in fluid communication with the intake passage, and an exhaust passage configured to channel an exhaust gas from the combustion chamber to the close-coupled DOC. The method includes starting the engine to commence a warm-up thereof. The method also includes regulating the throttle during the warm-up of the engine to restrict supply of the flow of intake air to the combustion chamber. The method additionally includes injecting a predetermined amount of fuel into the combustion chamber during the warm-up of the engine and during an exhaust cycle thereof, such that the injected amount of fuel is carried by the exhaust gas and burned in the exhaust passage. The steps of regulating the throttle and injecting the predetermined amount of fuel into the combustion chamber during the warm-up of the engine together increase temperature of the exhaust gas for the rapid light-off of the close-coupled DOC.

The step of regulating the throttle to restrict supply of the flow of intake air to the combustion chamber may include regulating the throttle in the range of 50-60% of the throttle's available opening.

The engine may include an exhaust gas recirculation (EGR) valve configured to return a predetermined portion of the exhaust gas from the exhaust passage into the combustion chamber for burning therein and thereby limit oxides of nitrogen ($NO_X$) in the exhaust gas.

The step of regulating the EGR valve to return the predetermined portion of the exhaust gas from the exhaust passage into the combustion chamber may be accomplished in an open loop operation. The act of regulating the EGR valve may also include restricting the EGR valve to approximately 30% of its available opening.

The engine may include a variable geometry turbocharger (VGT) configured to pressurize the flow of intake air. In such a case, the method may also include regulating the VGT during the warm-up of the engine to limit generation of a boost pressure in the flow of intake air and thereby minimize unstable operation of the engine. The VGT may include a plurality of adjustable vanes configured to regulate the boost pressure in the flow of intake air.

The step of regulating the VGT to limit generation of boost pressure in the flow of intake air may be accomplished in an open loop operation.

The method may additionally include continuing the warm-up of the engine until the exhaust gas reaches a temperature in the range of 120-130 degrees Celsius.

Each of the steps of starting the engine, injecting the predetermined amount of fuel into the combustion chamber, regulating the EGR valve, regulating the VGT, and continuing the warm-up of the engine may be accomplished via the controller.

A system having a controller configured to perform the above method and affect the desired rapid light-off of the close-coupled DOC is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
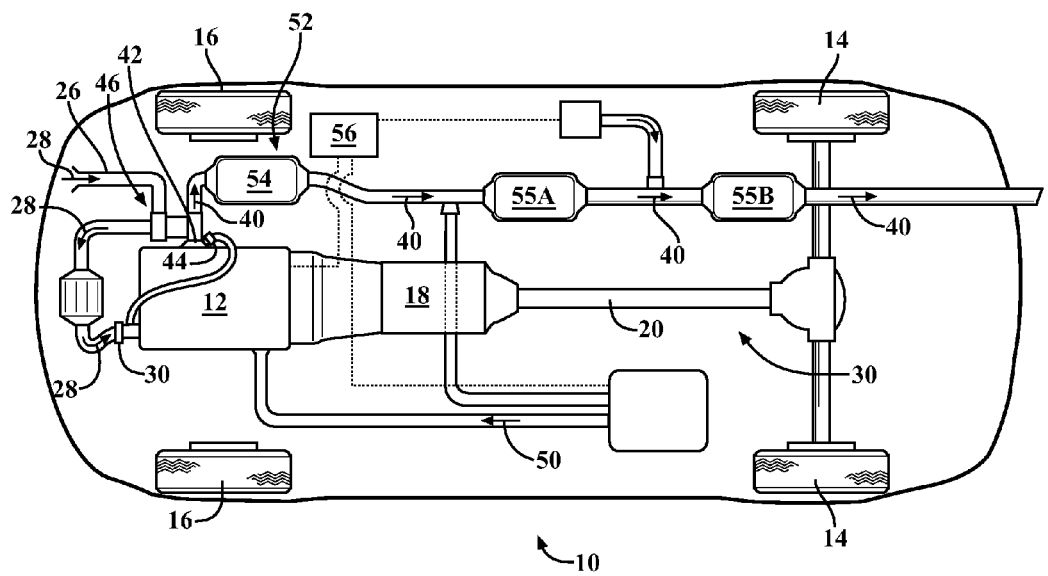
FIG. 1 is a schematic illustration of a vehicle including a compression-ignition internal combustion engine with an exhaust gas recirculation (EGR) valve and a variable geometry turbocharger (VGT); the engine being fluidly connected with an exhaust gas after-treatment (AT) system having a diesel oxidation catalyst (DOC) that is close-coupled to the engine.

Referring to the drawings, wherein like reference numbers refer to like components, FIG. 1 shows a schematic view of a vehicle 10. The vehicle 10 incorporates a powertrain that includes an internal combustion engine 12. The engine 12 is configured as a compression-ignition, i.e., diesel, type. The engine 12 applies its torque to the driven wheels 14 and/or 16 through a transmission 18 and via a drive or a propeller shaft 20 (as shown in FIG. 1).

Figure 2:
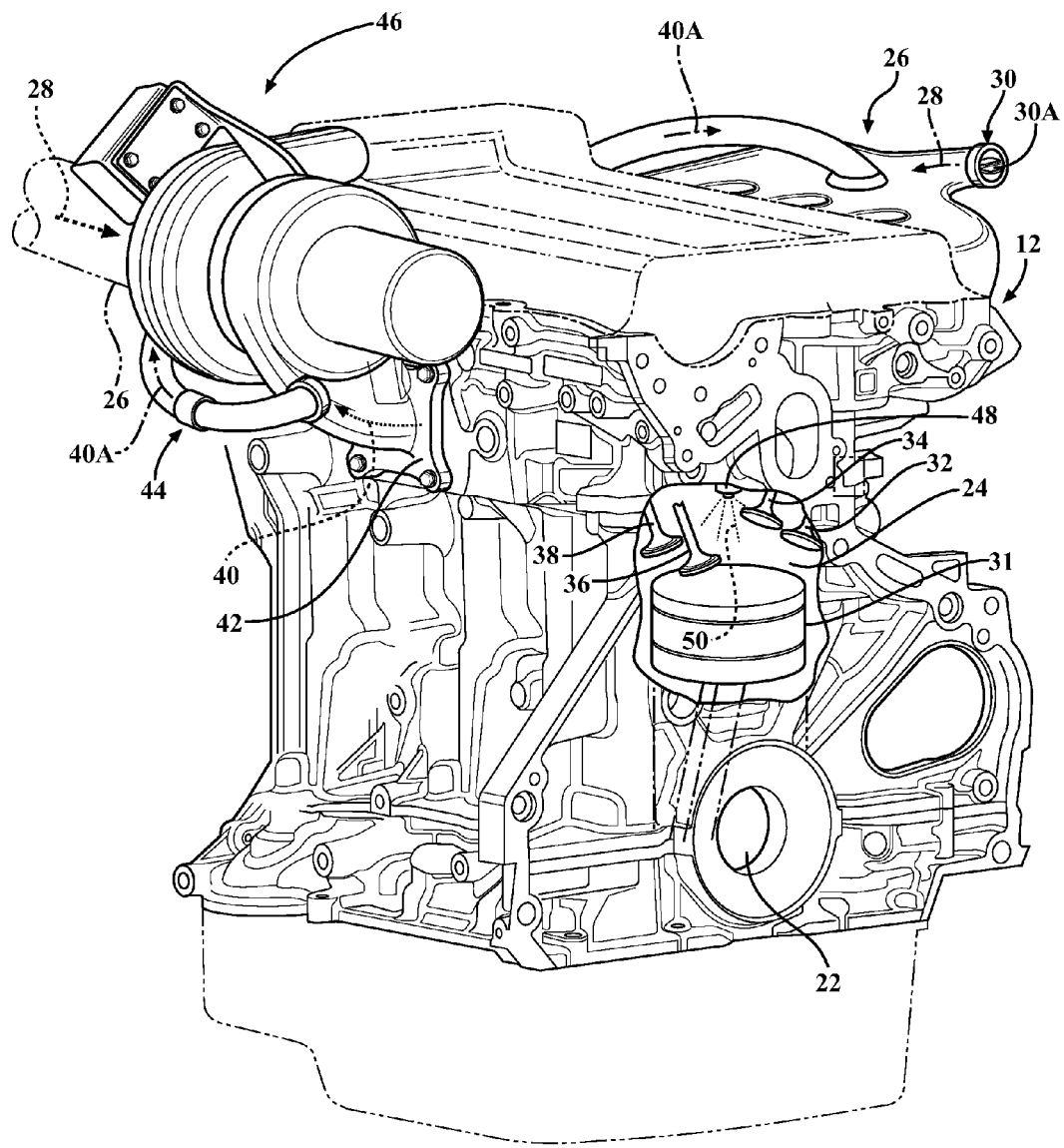
FIG. 2 is a schematic perspective close-up view of the engine shown in FIG. 1.

As shown in FIG. 2, the engine 12 includes a crankshaft 22 and cylinders defining combustion chambers 24 that are configured to burn a mixture of fuel and air therein.

Although a single combustion chamber 24 is shown, the engine 12 may include as many such combustion chambers as required by the specific design of the engine. The engine 12 also includes an intake passage 26 that is in fluid communication with the combustion chambers 24. The intake passage 26 is configured to deliver a flow of intake air 28 from the atmosphere or ambient to the combustion chambers 24. As shown in FIG. 1, a throttle 30, such as having a moveable throttle blade 30A (shown in FIG. 2), is positioned at the intake passage 26 and configured to control supply of the flow of intake air 28 delivered to the combustion chambers 24 through the intake passage.

As additionally shown in FIG. 2, each combustion chamber 24 also includes a piston 31 and a connecting rod that is not shown, but the existence of which would be appreciated by those skilled in the art. Each piston 31 is configured to reciprocate under the force of combustion inside the respective combustion chamber 24, and thereby rotate the crankshaft 22 via the connecting rod and regulate volume of the combustion chamber. As additionally shown in FIG. 2, each combustion chamber 24 may be provided with a first intake valve 32, a second intake valve 34, a first exhaust valve 36, and a second exhaust valve 38. Each intake valve 32, 34 is configured to control a supply of air or of air and fuel into the respective combustion chamber 24 when the engine 12 is propelling the vehicle 10. Each exhaust valve 36, 38 is configured to control the removal of a post-combustion exhaust gas 40 from the respective combustion chamber 24 via an exhaust passage 42. Although two intake valves 32, 34 and two exhaust valves 36, 38 are described herein and depicted in the figures, nothing precludes the engine 12 from being equipped with fewer or greater number of intake and exhaust valves.

As shown in FIG. 1, the engine 12 may include an exhaust gas recirculation (EGR) valve 44. The EGR valve 44 is configured to provide selective fluid communication between the exhaust passage 42 and the combustion chambers 24, i.e., is designed and structured to selectively restrict the exhaust passage 42. Accordingly, the exhaust passage 42 channels flow of the exhaust gas 40 from the combustion chamber 24 to the EGR valve 44. The EGR valve 44 then returns a portion 40A of the exhaust gas 40 from the exhaust passage 42 into the intake passage 26 and from the intake passage into the combustion chambers 24 for further burning therein. Such additional burning of the portion 40A of the exhaust gas 40 is generally intended to limit presence of oxides of nitrogen ($NO_x$) in the exhaust gas.

Figure 3:
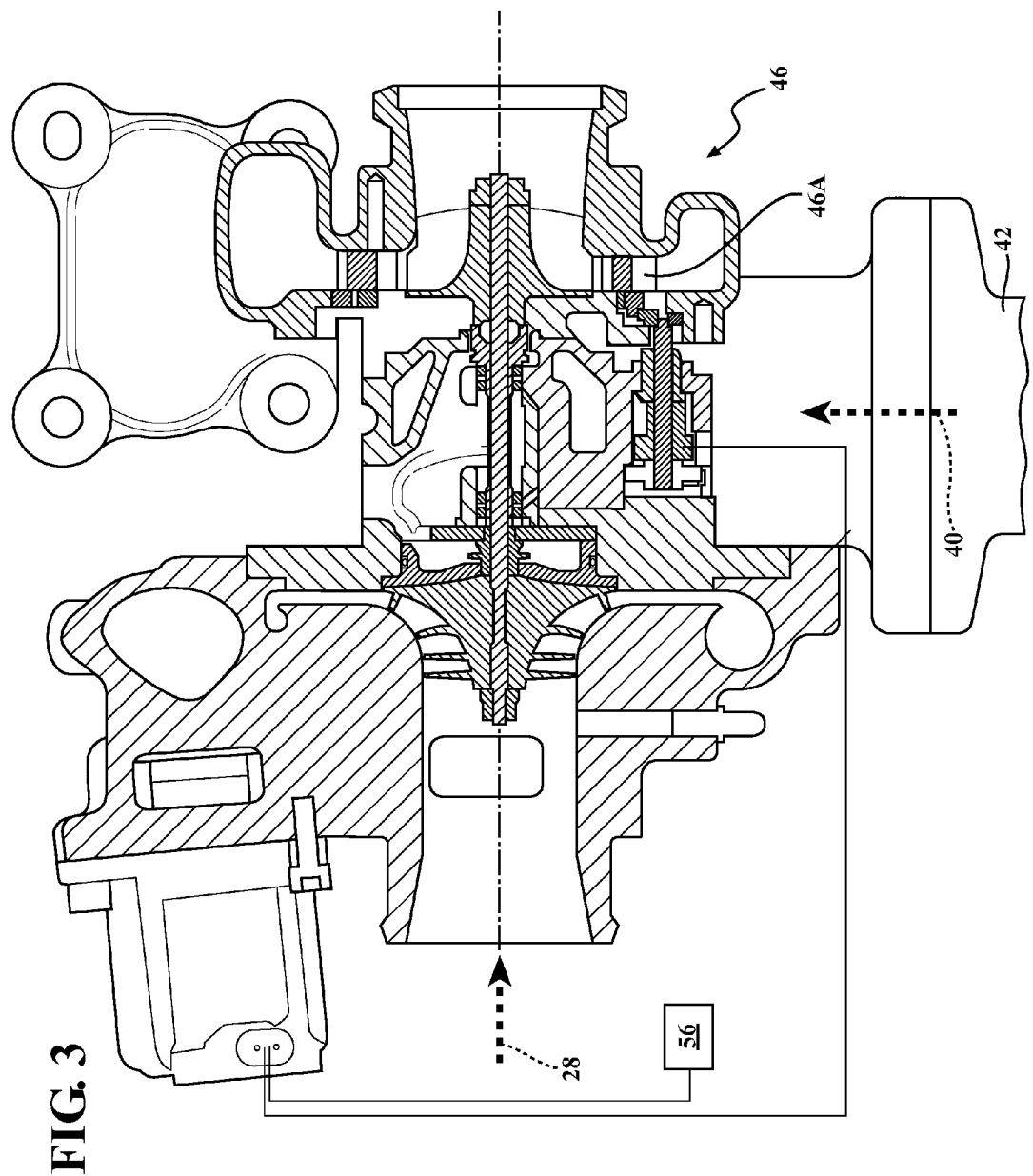
FIG. 3 is a schematic cross-sectional view of the VGT shown in FIGS. 1 and 2.

As shown in FIGS. 1 and 2, the engine 12 may additionally include a variable geometry turbocharger (VGT) 46 positioned at the intake passage 26 and configured to pressurize the flow of intake air 28 prior to the delivery of the intake airflow to the combustion chambers 24. The VGT 46 may include a variable position vane mechanism with a plurality of moveable vanes 46A, shown in FIG. 3. The vanes 46A are configured to adapt operation of the VGT in line with operating speed of the engine 12 and thus facilitate increased engine operating efficiency. The exhaust passage 42 is configured to channel the exhaust gas 40 from the combustion chambers 24 to the VGT 46 for pressurizing the flow of intake air 28 and subsequent channeling of the exhaust gas to an AT system. Although the VGT 46 is shown, nothing precludes the engine 12 from being configured and operated without such a power augmentation device.

As shown in FIG. 2, the engine 12 additionally includes fuel injectors 48. Fuel injectors 48 are provided for each combustion chamber 24 and are configured to supply a metered amount of fuel 50 for mixing with the flow of intake air 28 and combustion inside the respective combustion chamber 24. Following a start of the engine 12, the combustion of the mixture of flow of intake air 28 and fuel 50 inside the combustion chambers 24 steadily increases temperature of the exhaust gas 40 and temperature of the entire engine during a transient warm-up stage of engine operation. As will be appreciated by those skilled in the art, exhaust emissions, fuel efficiency, and power output of the engine 12 may each be affected by the operating temperature of the engine 12.

The vehicle 10 also includes a diesel engine after-treatment (AT) system 52. The AT system 52 may include a number of exhaust after-treatment devices configured to methodically remove largely carbonaceous particulate byproducts of engine combustion from the exhaust gas 40 and reduce emissions of such particulates into the atmosphere. As shown, the AT system 52 includes a diesel oxidation catalyst (DOC) 54. The DOC 54 is configured to store and burn off hydrocarbons (HC), while a selective catalytic reduction (SCR) catalyst 55A may be arranged downstream of the DOC 54, as shown, for converting oxides of nitrogen ($NO_x$) into diatomic nitrogen ($N_2$) and water ($H_2O$). Generally, the DOC 54 becomes activated and reaches operating efficiency at elevated temperatures. Additionally, at lower temperatures of the engine 12, higher feed concentration of hydrocarbons present in the exhaust gas 40 may retard activity of the catalysts. As shown in FIG. 1, the DOC 54 may be mounted in close proximity, i.e., close-coupled, to the VGT 46 in order to reduce loss of thermal energy from the flow of exhaust gas 40 to the ambient prior to the gas reaching the DOC. In addition to the DOC 54, the AT system 52 may include a diesel particulate filter (DPF) 55B, as well as the above-mentioned SCR catalyst. Although neither the SCR catalyst nor the DPF is described in detail, operation of such after-treatment devices is known to those skilled in the art.

With resumed reference to FIG. 1, the vehicle 10 may also include a controller 56 configured to regulate the operation of the engine 12. The controller 56 includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 56 may also include a floppy disk, a flexible disk, hard disk, magnetic tape, any other magnetic medium, a CD-ROM, DVD, any other optical medium, etc. The controller 56 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 56 or accessible thereby may be stored in the memory and automatically executed to provide the required functionality.

As part of controlling operation of the engine 12, the controller 56 is configured to start the engine 12 for commencing a warm-up transient cycle prior to the engine 12 reaching stable operating temperature. The controller 56 is also configured to regulate the throttle 30 during the warm-up of the engine 12 to restrict supply of the flow of intake air 28 to the combustion chambers 24. A preset position of the throttle 30 that generated a target mass of intake air 28 may be determined empirically based on desired light-off rate of the DOC 54 during laboratory and/or vehicle testing. Specifically, the controller 56 may be programmed to regulate the throttle 30 in the range of 50-60% of its available opening. The actual mass of intake air 28 flowing into the combustion chambers 24 may be sensed and communicated by an appropriate sensor 58 to the controller 56 for determination of whether the target mass of intake air 28 was reached.

The controller 56 may also be configured to command the fuel injectors 48 to inject a predetermined amount of fuel 50 into the combustion chambers 24 during the warm-up of the engine 12 while the engine is operating in an exhaust cycle. Such injection of the predetermined amount of fuel 50 during the warm-up of the engine 12 and during the engine's exhaust cycle permits the injected amount of fuel 50 to be carried by the exhaust gas 40 and burned in the exhaust passage 42 to thereby increase the temperature of the exhaust gas.

The combined regulation of the throttle 30 and fuel injectors 48 during the warm-up of the engine 12 as described above is intended to increase temperature of the exhaust gas 40 for a more rapid light-off of the close-coupled DOC 54 in comparison to DOC light-off during an engine warm-up without such regulation, while limiting an amount of hydrocarbons that can slip through the DOC 54 prior to DOC light-off. Accordingly, the temperature of the exhaust gas 40 may be increased more rapidly, such that the timeframe between the start of the engine 12 and the moment the downstream SCR catalyst 55A can be effective in converting $NO_X$ into $N_2$ and $H_2O$, or the exhaust gas warm-up phase, may be shortened. Additionally, combined regulation of the throttle 30 and fuel injectors 48 as described above is intended to reduce consumption of fuel 50 during the warm-up phase.

The controller 56 may be additionally configured to regulate the EGR valve 44 during the warm-up of the engine 12 to limit oxides of nitrogen ($NO_X$) in the exhaust gas 40. The controller 56 may also be configured to regulate the EGR valve 44 to return the predetermined portion of the exhaust gas 40 from the exhaust passage 42 into the combustion chamber 24 via an open loop operation. The open loop control of the EGR valve 44 is intended to provide sufficient amount of recirculated exhaust gas 40 to the combustion chambers 24 for reduction of $NO_X$ in the exhaust gas 40, without the need for continuous adjustment of the EGR valve. An effective preset or target position of EGR valve 44 may be determined empirically based on desired light-off rate of the DOC 54 during laboratory and/or vehicle testing. Specifically, the controller 56 may be configured to regulate the EGR valve 44 via restricting the EGR valve to approximately 30% of its available opening.

Additionally, in the case where the engine 12 also includes the VGT 46, the controller 56 may be further configured to regulate the plurality of adjustable vanes 46A of the VGT 46 during the warm-up of the engine to limit the generation of boost pressure in the flow of intake air 28. Such control of the VGT 46 is intended to minimize unstable operation of the engine 12 during the transient warm-up cycle, and may be accomplished by the controller 56 via an open loop operation, where no feedback of position of the vanes 46A is required.

The controller 56 may be configured to continue the warm-up phase of the exhaust gas 40 employing the above detailed means until the exhaust gas reaches a predetermined temperature, such as in the range of 120-130 degrees Celsius. Following the completion of the exhaust gas 40 warm-up phase, the exhaust gas is intended to have reached sufficient temperature for the close-coupled DOC 54 to effectively burn off the HC. Accordingly, following the exhaust gas 40 warm-up phase, the controller 56 may be configured to switch to an algorithm in which operation of the throttle 30, the fuel injectors 48, the EGR valve 44, and the VGT 46 targets both steady and transient operating conditions that are likely to be encountered by a fully warm engine 12.

Figure 4:
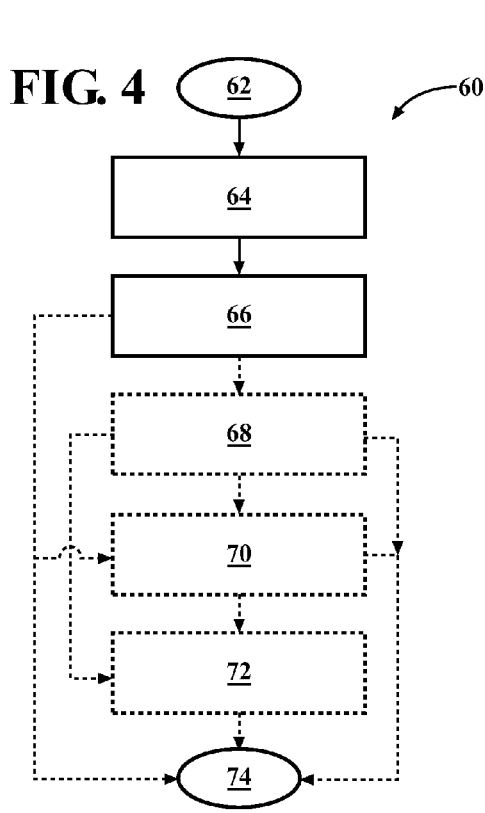
FIG. 4 is a flow diagram of a method for generating a rapid light-off for the DOC depicted in FIG. 1.

FIG. 4 depicts a method 60 of generating via an electronic controller 56 a rapid light-off for the DOC 54 close-coupled to the compression-ignition engine 12, described above with respect to FIGS. 1-3. The method 60 commences in frame 62 with starting the engine 12 to commence a warm-up thereof. The method 60 then proceeds from frame 62 to frame 64 and includes the controller 56 regulating the throttle 30 during the warm-up of the engine 12 to restrict the flow of the intake air 28 to the combustion chamber 24. Following frame 64, in frame 66 the method 60 includes injecting the predetermined amount of fuel 50 into the combustion chamber 24 during the warm-up of the engine 12 and during an exhaust cycle thereof such that the injected predetermined amount of fuel 50 is then carried by the exhaust gas 40 and burned in the exhaust passage 42. Accordingly, as described with respect to FIGS. 1 and 2 above, the steps of regulating the throttle 30 together with injecting the predetermined amount of fuel 50 during the warm-up of the engine 12 act to increase temperature of the exhaust gas 40 for the rapid light-off of the close-coupled DOC 54.

According to the method 60, following frame 66 the method may advance to frame 68 for regulating the EGR valve 44 during the warm-up of the engine 12 to reduce amount of $NO_X$ in the exhaust gas 40. In addition, following either frame 66 or frame 68, the method 60 may proceed to frame 70 where it includes regulating the VGT 46 during the warm-up of the engine 12 to limit the generation of boost pressure in the flow of intake air 28 and thereby minimize unstable operation of the engine. Furthermore, following either frame 66, 68, or 70, the method 60 may proceed to frame 72 where it includes continuing the warm-up of the engine 12 until the exhaust gas 40 reaches a temperature in the range of 120-130 degrees Celsius. The method 60 may conclude in frame 74 with the controller 56 switching to an algorithm in which a fully-warm operation of the engine 12 is targeted once the light-off of the close-coupled DOC 54 has been achieved. Control over the throttle 30, the fuel injectors 48, the EGR valve 44, and the VGT 46 may then be switched to an algorithm that targets fully-warm operation of the engine 12.

Figure 5:
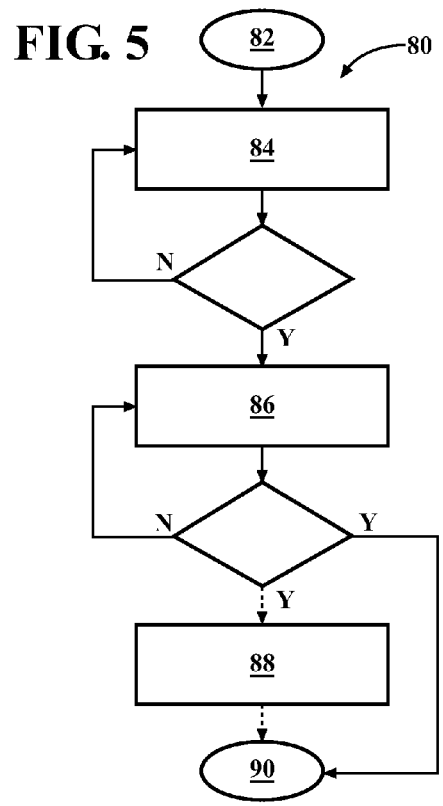
FIG. 5 is a flow diagram of an alternative method for generating a rapid light-off for the DOC depicted in FIG. 1.

FIG. 5 depicts an alternative method 80 for facilitating a rapid temperature increase of the exhaust gas 40 entering the close-coupled DOC 54. The method 80 commences in frame 82 with starting the engine 12 to commence a warm-up thereof. The method 80 then proceeds from frame 82 to frame 84 and may include the controller 56 regulating the EGR valve 44 to a preset or target position, such as approximately 30% of the available opening, during the warm-up of the engine 12. If the target position of the EGR valve 44 was reached, the method 80 may proceed to frame 86, where the method includes the controller 56 regulating the throttle 30 during the warm-up of the engine 12 to restrict the flow of the intake air 28 to the combustion chamber 24. As described above with respect to FIGS. 1 and 2, the throttle 30 may be regulated in the range of 50-60% of its available opening.

If the target position of the throttle 30 was reached, the method 80 may advance to frame 88, where the method 80 may include injecting the predetermined amount of fuel 50 into the combustion chamber 24. Additionally, after frame 88 the method 80 may proceed to regulate the VGT 46 as described with respect to FIGS. 1-3. The method 80 may conclude in frame 90 with the light-off of the close-coupled DOC 54 having been achieved either after frame 86 or frame 88. Following completion of the method 80, the controller 56 may switch to an algorithm in which a fully-warm operation of the engine 12 is targeted, wherein the throttle 30, the fuel injectors 48, the EGR valve 44, and the VGT 46 are controlled specifically for such conditions.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of generating, via an electronic controller, a rapid light-off for a diesel oxidation catalyst (DOC) close-coupled to a compression-ignition engine, the method comprising:
   starting the engine to commence a warm-up thereof, wherein the engine includes an intake passage, a throttle configured to control supply of a flow of intake air through the intake passage, a combustion chamber in fluid communication with the intake passage, and an exhaust passage configured to channel flow of an exhaust gas from the combustion chamber to the close-coupled DOC;
   regulating the throttle during the warm-up of the engine to restrict the flow of intake air to the combustion chamber;
   injecting a predetermined amount of fuel into the combustion chamber during the warm-up of the engine and during an exhaust cycle thereof, such that the injected predetermined amount of fuel is carried by the exhaust gas and burned in the exhaust passage;
   wherein said regulating the throttle together with said injecting the predetermined amount of fuel during the warm-up of the engine act to increase temperature of the exhaust gas for the rapid light-off of the close-coupled DOC;
   continuing said regulating the throttle together with said injecting the predetermined amount of fuel during the warm-up of the engine until the exhaust gas reaches a temperature in the range of 120-130 degrees Celsius; and
   following the exhaust gas reaching the temperature in the range of 120-130 degrees Celsius, completing the warm-up of the engine and the rapid light-off of the close-coupled DOC, and switching to a control algorithm for a fully warm engine.

2. The method of claim 1, wherein said regulating the throttle to restrict the flow of intake air to the combustion chamber includes regulating the throttle in the range of 50-60% of its available opening.

3. The method of claim 1, wherein each of said starting the engine, injecting the predetermined amount of fuel into the combustion chamber, regulating the EGR valve, regulating the VGT, continuing the warm-up of the engine, completing the warm-up of the engine and the rapid light-off of the close-coupled DOC, and switching to a control algorithm for a fully warm engine is accomplished via the controller.

4. The method of claim 1, wherein the engine includes an exhaust gas recirculation (EGR) valve configured to return a predetermined portion of the exhaust gas from the exhaust passage into the combustion chamber for burning therein and thereby limit oxides of nitrogen (NOx) in the exhaust gas, further comprising regulating the EGR valve during the warm-up of the engine to limit oxides of nitrogen (NOx) in the exhaust gas.

5. The method of claim 4, wherein said regulating the EGR valve to return the predetermined portion of the exhaust gas from the exhaust passage into the combustion chamber is accomplished in an open loop operation.

6. The method of claim 5, wherein said regulating the EGR valve includes restricting the EGR valve to approximately 30% of its available opening.

7. The method of claim 4, wherein the engine includes a variable geometry turbocharger (VGT) configured to pressurize the flow of intake air, further comprising regulating the VGT during the warm-up of the engine to limit generation of a boost pressure in the flow of intake air and thereby minimize unstable operation of the engine.

8. The method of claim 7, wherein the VGT includes a plurality of adjustable vanes configured to regulate the boost pressure in the flow of intake air.

9. The method of claim 7, wherein said regulating the VGT to limit generation of the boost pressure in the flow of intake air is accomplished in an open loop operation.

10. A system for generating a rapid light-off for a diesel oxidation catalyst (DOC) close-coupled to a compression-ignition engine, the system comprising:
    an engine having:
        an intake passage;
        a throttle configured to control supply of a flow of intake air through the intake passage;
        a combustion chamber in fluid communication with the intake passage; and
        an exhaust passage configured to channel flow of an exhaust gas from the combustion chamber to the close-coupled DOC; and
    a controller configured to:
        start the engine to commence a warm-up thereof;
        regulate the throttle during the warm-up of the engine to restrict the supply of the flow of intake air to the combustion chamber; and
        inject a predetermined amount of fuel into the combustion chamber during the warm-up of the engine and during an exhaust cycle thereof, such that the predetermined injected amount of fuel is carried by the exhaust gas and burned in the exhaust passage;
        wherein regulation of the throttle together with injection of the predetermined amount of fuel via the controller during the warm-up of the engine act to increase temperature of the exhaust gas for the rapid light-off of the close-coupled DOC;

continue to regulate the throttle and inject the predetermined amount of fuel during the warm-up of the engine until the exhaust gas reaches a temperature in the range of 120-130 degrees Celsius; and following the exhaust gas reaching the temperature in the range of 120-130 degrees Celsius, complete the warm-up of the engine and the rapid light-off of the close-coupled DOC, and switch to a control algorithm for a fully warm engine.

11. The system of claim 10, wherein the controller is programmed to regulate the throttle in the range of 50-60% of its available opening.

12. The system of claim 10, wherein the engine additionally includes an exhaust gas recirculation (EGR) valve configured to return a predetermined portion of the exhaust gas from the exhaust passage into the combustion chamber for burning therein, and the controller is further configured to regulate the EGR valve during the warm-up of the engine to limit oxides of nitrogen (NOx) in the exhaust gas.

13. The system of claim 12, wherein the controller is configured to regulate the EGR valve to return the predetermined portion of the exhaust gas from the exhaust passage into the combustion chamber via an open loop operation.

14. The system of claim 12, wherein the controller is configured to regulate the EGR valve via restricting the EGR valve to approximately 30% of its available opening.

15. The system of claim 10, wherein the engine additionally includes a variable geometry turbocharger (VGT) configured to pressurize the flow of intake air, and the controller is further configured to regulate the VGT during the warm-up of the engine to limit generation of a boost pressure in the flow of intake air and thereby minimize unstable operation of the engine.

16. The system of claim 15, wherein the VGT includes a plurality of adjustable vanes configured to regulate the boost pressure in the flow of intake air, and wherein the plurality of adjustable vanes is regulated by the controller.

17. The system of claim 15, wherein the controller is configured to regulate the VGT to limit generation of the boost pressure in the flow of intake air via an open loop operation.

18. A method of generating, via an electronic controller, a rapid light-off for a diesel oxidation catalyst (DOC) close-coupled to a compression-ignition engine, the method comprising:

starting the engine to commence a warm-up thereof, wherein the engine includes an intake passage, a throttle configured to control supply of a flow of intake air through the intake passage, a combustion chamber in fluid communication with the intake passage, and an exhaust passage configured to channel an exhaust gas from the combustion chamber to the close-coupled DOC, an exhaust gas recirculation (EGR) valve configured to return a predetermined portion of the exhaust gas from the exhaust passage into the combustion chamber for burning therein and thereby limit oxides of nitrogen (NOx) in the exhaust gas, and a variable geometry turbocharger (VGT) configured to pressurize the intake airflow;

regulating the throttle during the warm-up of the engine to restrict supply of the flow of intake air to the combustion chamber;

injecting a predetermined amount of fuel into the combustion chamber during the warm-up of the engine and during an exhaust cycle thereof, such that the injected amount of fuel is carried by the exhaust gas and burned in the exhaust passage;

regulating the EGR valve during the warm-up of the engine to return a predetermined portion of the exhaust gas from the exhaust passage into the combustion chamber for burning therein and thereby limit oxides of nitrogen (NOx) in the exhaust gas;

regulating the VGT during the warm-up of the engine to limit generation of a boost pressure in the flow of intake air and thereby minimize unstable operation of the engine;

continuing said regulating the throttle together with said injecting the predetermined amount of fuel during the warm-up of the engine until the exhaust gas reaches a temperature in the range of 120-130 degrees Celsius;

wherein said regulating the throttle, injecting the predetermined amount of fuel, and regulating the EGR valve, in combination, act to increase temperature of the exhaust gas for the rapid light-off of the close-coupled DOC; and following the exhaust gas reaching the temperature in the range of 120-130 degrees Celsius, completing the warm-up of the engine and the rapid light-off of the close-coupled DOC, and switching to a control algorithm for a fully warm engine.

\* \* \* \* \*